United States Patent [19]

Sheynblat

[11] Patent Number: 5,796,773
[45] Date of Patent: *Aug. 18, 1998

[54] COMPENSATING FOR MULTIPATH ERRORS, IONOSPHERIC TIME DELAY AND NOISE ERRORS IN DIFFERENTIAL SATELLITE POSITIONING SYSTEMS

[75] Inventor: Len Sheynblat, Belmont, Calif.

[73] Assignee: Trimble Navigation Limited, Sunnyvale, Calif.

[*] Notice: The term of this patent shall not extend beyond the expiration date of Pat. No. 5,563,917.

[21] Appl. No.: 722,436

[22] Filed: Oct. 7, 1996

Related U.S. Application Data

[63] Continuation of Ser. No. 216,671, Mar. 22, 1994, Pat. No. 5,563,917.

[51] Int. Cl.$^6$ ........................................................ H04B 1/69
[52] U.S. Cl. ........................... 375/200; 375/346; 342/357
[58] Field of Search ................................ 375/346, 349, 375/200, 367; 342/357, 358, 356; 455/12.1; 364/443, 444, 449, 549

[56] References Cited

U.S. PATENT DOCUMENTS

| | | | |
|---|---|---|---|
| 3,537,008 | 10/1970 | Lakatos | 325/65 |
| 3,542,954 | 11/1970 | Flanagan | 179/1 |
| 3,566,035 | 2/1971 | Noll et al. | 179/1 |
| 3,596,182 | 7/1971 | Menard | 325/67 |
| 3,605,018 | 9/1971 | Coviello | 325/65 |
| 3,662,108 | 5/1972 | Flanagan | 179/1 SA |
| 3,869,673 | 3/1975 | Close | |
| 4,349,915 | 9/1982 | Costas | 375/40 |
| 4,457,007 | 6/1984 | Gutleber | 375/102 |
| 4,463,357 | 7/1984 | MacDoran | |
| 4,672,638 | 6/1987 | Taguchi et al. | 375/99 |
| 5,111,298 | 5/1992 | Koo | 358/187 |
| 5,121,211 | 6/1992 | Koo | 358/187 |
| 5,418,538 | 5/1995 | Lau | |
| 5,563,917 | 10/1996 | Sheynblat | 375/346 |

OTHER PUBLICATIONS

R. Hatch, "The Synergism of GPS Code & Carrier Measurements", Proceedings for 3rd Int'l Geodetic Symposium on Salellite Doppler Positioning, N.M. State Univ., Las Crucas, Feb. 1982, pp. 1213–1232.

H–J Eueler & C.C. Goad, "On Optimal Filtering of GPS Dual Frequency Observations Without Using Orbit Information", vol. 65, Bull. Geodesique, 1991, pp. 130–145.

Tom Logsdon, *The Navstar Global Positioning System*, Van Nostrand Reinhold, New York, 1992.

"Special Committee 104 Recommendations for Differntial GPS Service", Navigation, vol. 1, No. 1 (1986), pp. 101–116.

P. Jorgenson, "Navstar/Global Positioning System 18–Satellite Constellations", The Journal of Navigation, vol. 2, 1984, pp. 1–12.

*Primary Examiner*—Stephen Chin
*Assistant Examiner*—Don Vo
*Attorney, Agent, or Firm*—Wagner, Murabito & Hao

[57] ABSTRACT

Method and apparatus for reducing the contributions of ionospheric propagation time delay error, multipath signal error and receiver noise error from signals received in a Satellite Positioning System (SATPS) from one or more SATPS satellites by formation and appropriate filtering of differences of signals DD that are differences of SATPS signals received by the SATPS receiver/processor. A difference signal DD of code-phase-derived, ionosphere-free signals and carrier-phase-derived, ionosphere-free signals is formed, and this difference signal is passed through a first statistical processing filter with an associated time constant $\tau 1$ in the approximate range 50–500 sec, to produce smoothed or filtered first difference signal with the estimated receiver noise error reduced or removed. The difference signal DD is passed through second and third statistical processing filters having associated time constants $\tau 2=5-20$ sec and $\tau 3=50-500$ sec, and the difference of the output signals of the second and third statistical processing filters is formed and subtracted from the filtered first difference signal to form a new difference signal that is primarily due to multipath error. This new difference signal is subtracted from thge pseudorange meausurement values to produce a signal with reduced multipath error.

22 Claims, 5 Drawing Sheets

COMPENSATING FOR MULTIPATH ERRORS, IONOSPHERIC TIME DELAY AND NOISE ERRORS IN DIFFERENTIAL SATELLITE POSITIONING SYSTEMS

This application is a continuation of the patent application U.S. Ser. No. 08/216,671, filed Mar. 22, 1994, now U.S. Pat. No. 5,563,917 and assigned to the assignee of the U.S. Pat. No. '671 application.

FIELD OF THE INVENTION

This invention relates to Satellite Positioning Systems (SATPS), and more particularly to determination and minimization of signal errors present in differential corrections and position calculations with ionospheric time delay accounted for separately.

BACKGROUND OF THE INVENTION

The NAVSTAR Global Positioning System (GPS), developed and implemented by the U.S. Department of Defense, uses position and time information broadcast from a constellation of up to 24 satellites, moving in non-geosynchronous orbits, to allow determination of the present time and observer location and velocity adjacent to the Earth's surface.

Several workers have proposed approaches for reducing or removing multipath signal errors. Lakatos, in U.S. Pat. No. 3,537,008, distinguishes between a direct or "specular" path from transmitter to receiver and one or more "echo" paths that provide multipath signals for that transmission. A modulated pilot signal is transmitted together with a message signal, and arrival of the known modulated signal is continuously monitored at the receiver. The modulated signal is of finite length and acts as a timing signal to open and close a gate at the receiver. The contemporaneously transmitted direct signal is admitted through the gate, but later arriving echo signals are not admitted. This system uses two parallel signal processing paths at the receiver, one path containing a phase locked loop for recognition of the modulated signal. If an echo signal arrives before the receiver gate closes, a portion of the echo signal will also be admitted and treated as part of the direct message signal.

Decomposition of the arriving signal into selected contiguous but nonoverlapping frequency intervals to reduce multipath signal error is disclosed in U.S. Pat. No. 3,542,954, issued to Flanagan. The transmitted direct signal and any echo signals are received and normalized at a plurality of spaced apart transducers, at each of which this frequency decomposition occurs. Among the transducers, the maximum signal in each frequency interval is chosen, and a composite direct signal at the intended receiver is constructed from this maximum signal set.

U.S. Pat. No. 3,566,035, issued to Noll et al, discloses use of the "complex cepstrum" (Fourier transform of the logarithm of the power spectrum plus phase angle) of short time interval, partly overlapping segments of a transmitted signal to determine periodicity or aperiodicity of a received signal. Flanagan discloses application of the cepstrum function to multipath signal suppression, in U.S. Pat. No. 3,662,108. The complex cepstrum of a received composite signal is formed, and the inverse Fourier transform of the real part of the cepstrum is computed. This inverse transform signal is clipped about a selected center to remove some distortion components, and the remaining "mountain top" signal has a sequence of maxima at time values corresponding to arrival of the desired signal and undesired multipath replicas at the receiver.

Menard discloses a multipath time delay and correlation bandwidth analyzer system in U.S. Pat. No. 3,596,182. A correlation function is formed between a signal received at the receiver and a selected reference signal generated at the receiver. If the received signal contains strong multipath contributions, displaced in time from each other, the correlation function will contain two or more correlation pulses or maxima, also displaced in time. The reference signal can be a time delayed replica of the received signal.

U.S. Pat. No. 3,605,018, issued to Coviello, discloses a nonlinear signal processing system useful for suppressing strong multipath signals in a quaternary phase, spread spectrum communications system. A received composite signal, containing the desired signal and a superimposed strong multipath signal, is passed through a circuit containing a signal envelope detector and a signal averager, arranged in parallel. The envelope detector and signal averager output signals are applied to two terminals of a differential amplifier. The diff amp output signal is an estimate of the desired signal.

A system for quantitatively measuring multipath signal distortion is disclosed by Close in U.S. Pat. No. 3,869,673. A local oscillator, mixer and amplitude limiter are applied to a received signal to provide a first signal representing frequency variation and a second signal representing amplitude variation of the received signal. A correlation signal formed from the product of these first and second signals is a quantitative measure of multipath distortion present in the received signal.

Costas discloses apparatus for minimization of distortion in signals containing multipath signals and Doppler shift effects in U.S. Pat. No. 4,349,915. Signal arrival delay, such as produced by multipath signals, is determined by examining a selected frequency contribution of spaced apart pulses that arrive at the receiver.

Gutleber, in U.S. Pat. No. 4,457,007, discloses a multipath signal interference reduction system in which a plurality of replicas of the received signal, with different time delays, amplitudes and signal widths, are sequentially subtracted from the arriving composite signal (desired signal plus multipath signals) to produce a new composite signal with markedly reduced multipath signal contribution.

An adaptive multipath distortion equalizer, disclosed by Nossen in U.S. Pat. No. 4,669,091, uses simulation of the multipath distortion, based upon the composite signals received. After this multipath distortion signal is estimated, this distortion signal is subtracted from the composite signal received to produce an estimate of the desired signal. This approach uses time delay lines, amplitude scale factors and phase adjustments to obtain the estimated multipath distortion signal.

In U.S. Pat. No. 4,672,638, Taguchi et al disclose a multipath signal canceller that uses an envelope detector to determine the shape of a received composite pulse. This shape is compared with the shape of an undistorted pulse (earliest arriving pulse) stored in the receiver. The difference between these two shapes is used to construct a distortion-cancelling signal for signals that subsequently arrive at the receiver.

A method for multipath signal suppression in television receivers, disclosed by David Koo in U.S. Pat. No. 5,111,298, uses transmission of a test signal that is sampled and transformed to the frequency domain. Portions of the frequency spectrum are redistributed to other frequency ranges where the spectrum amplitude is nearly zero, and the redistributed spectrum is transformed back to the time domain to

3 produce a processed signal where echo signal contributions are suppressed.

Koo discloses another method for echo signal cancellation in television receivers in U.S. Pat. No. 5,121,211, again working with the frequency domain transform of a received test signal.

These approaches often require extensive post-processing and use mathematically complex manipulations that are not consistent with the requirements for real time processing of signals received at high data rates. Further, these approaches do not allow separate compensation for atmospheric time delay of signal propagation.

What is needed is a method for reducing or eliminating the error contributions from multipath signals and from receiver noise by parallel, real time processing of signals derived from the GPS (or, more generally, SATPS) signals received from the SATPS satellites. Preferably, the system should allow for separate compensation of ionospheric time delay of signal propagation so that certain time constants associated with statistical processing of the SATPS signals may be as large as desired.

SUMMARY OF THE INVENTION

These needs are met by the invention, which provides method and apparatus for receiving and processing SATPS signals and generating differential SATPS corrections, in parallel and in real time. The multipath signal error contribution and receiver noise error contribution are separately determined by appropriate filtering of certain double differences of the code phase and carrier phase signals.

An SATPS reference station (RS) receives SATPS signals at two different carrier frequencies, referred to as L1 and L2. In the absence of anti-spoofing (AS), these measurements use L1 carrier frequencies for C/A code phase or P code phase (PR1), L1 frequencies for carrier phase ($\Phi$1), L2 frequencies for P code phase and L2 frequencies for carrier phase ($\Phi$2). In the presence of anti-spoofing, the reference station typically measures L1 C/A code phase, L1 carrier phase and the cross-correlation of the L1 and L2 signals. This last measurement yields accurate L2 code phase and L2 carrier phase measurements. Other techniques are also available, for example, where the L2 P code is recovered from an encrypted Y code. The reference station uses these measurements along with its known location to generate differential SATPS corrections for all SATPS satellites in view from this station.

The values of PR1, $\Phi$1, PR2 and $\Phi$2 signals are passed to a first signal processing module of the reference station, which determines the ionosphere group signal propagation time delay $\tau_I$ and its rate of change with respect to time $\tau_I$, using the relative time delays $\tau_{L1}$ and $\tau_{L2}$ measured at the two carrier frequencies.

A first difference signal $IDD(t_n;t_0)$ is formed in a second signal processing module and passed through first and second statistical processing filters or low pass filters (SPFs) having associated time constants $\tau 1=5$ to 20 sec (with a preferred value of 6 sec) and $\tau 2=50$ to 1000 sec (with a preferred value of 600 sec), to produce first and second processed signals $IDD1(t_n;t_0)$ and $IDD2(t_n;t_0)$. Another signal $IDD3(t_n;t_0)$, which is the difference $IDD2(t_n;t_0)-IDD1(t_n;t_0)$ of the output signals from the second and first SPFs, is formed.

Optionally, a second difference signal $IDD(t_n;t_{n-1})$ of code-phase-derived delta range signals and carrier-phase-derived delta range signals, which is free of ionosphere time delay, is formed at the second signal processing module, and

4 this difference signal is passed through a third SPF with an associated time constant $\tau 3$ in the approximate range 50 to 1000 sec (with a preferred value of 300 sec), to produce a fourth processed signal that is an estimate $IDD4(t_n;t_{n-1})$ of the receiver noise error of the filtered signal, with multipath error removed.

Optionally, another signal $IDD(t_n;t_{n-1})^2$ is also formed and passed through a fourth SPF with an associated time constant $\tau 4$ in the approximate range 50 to 1000 sec (with a preferred value of 300 sec), to produce a fifth processed signal $IDD5(t_n;t_{n-1})$.

Optionally, a difference signal $IDD6(t_n;t_0)=IDD(t_n;t_0)-IDD3(t_n;t_0)$ is formed and passed through a fifth SPF with an associated time constant $\tau 5=\tau 3$ to produce a smoothed or filtered seventh processed signal $IDD7(t_n;t_0)$ with the estimated multipath signal and receiver noise error reduced or removed.

Optionally, a signal $IDD6(t_n;t_0)^2$ is formed and passed through a sixth SPF with an associated time constant $\tau 6=\tau 5$ to produce an eighth processed signal $IDD8(t_n;t_0)$.

Optionally, a signal $IDD(t_n;t_0)^2$ is formed and filtered in a seventh SPF with a time constant $\tau 7$ in the approximate range 50 to 1000 sec (with a preferred value of 300 sec), to produce a ninth processed signal $IDD9(t_n;t_0)$.

The third processed signal $IDD3(t_n;t_0)$ estimates the multipath contribution, if any, to the original difference signal $IDD(t_n;t_0)$. The signal $IDD3(t_n;t_0)$ is passed to a third signal processing module, which uses the multipath signal estimate to improve the pseudorange corrections PRC that are transmitted for differential SATPS purposes.

Suitable statistical processing or low pass filters for the preceding procedure include the Morrison filter, the Hatch filter, the Kalman filter, and any of a class of positive, monotonic filters with a finite width filter window as set forth below. These respective filters are discussed in N. Morrison, *Introduction to Sequential Smoothing and Prediction*, McGraw Hill, New York, 1969; R. Hatch, "The Synergism of GPS Code and Carrier Measurements," Proceedings of Third International Geodetic Symposium on "Satellite Doppler Positioning," New Mexico State University, Las Cruces, February 1982, pp. 1213–1232; and H- J Eueler and C. C. Goad, "On optimal filtering of GPS dual frequency observations without using orbit information," vol. 65 Bulletin Geodesique 1991, pp. 130–145, incorporated by reference herein.

DESCRIPTION OF BEST MODE OF THE INVENTION

Figure 1:
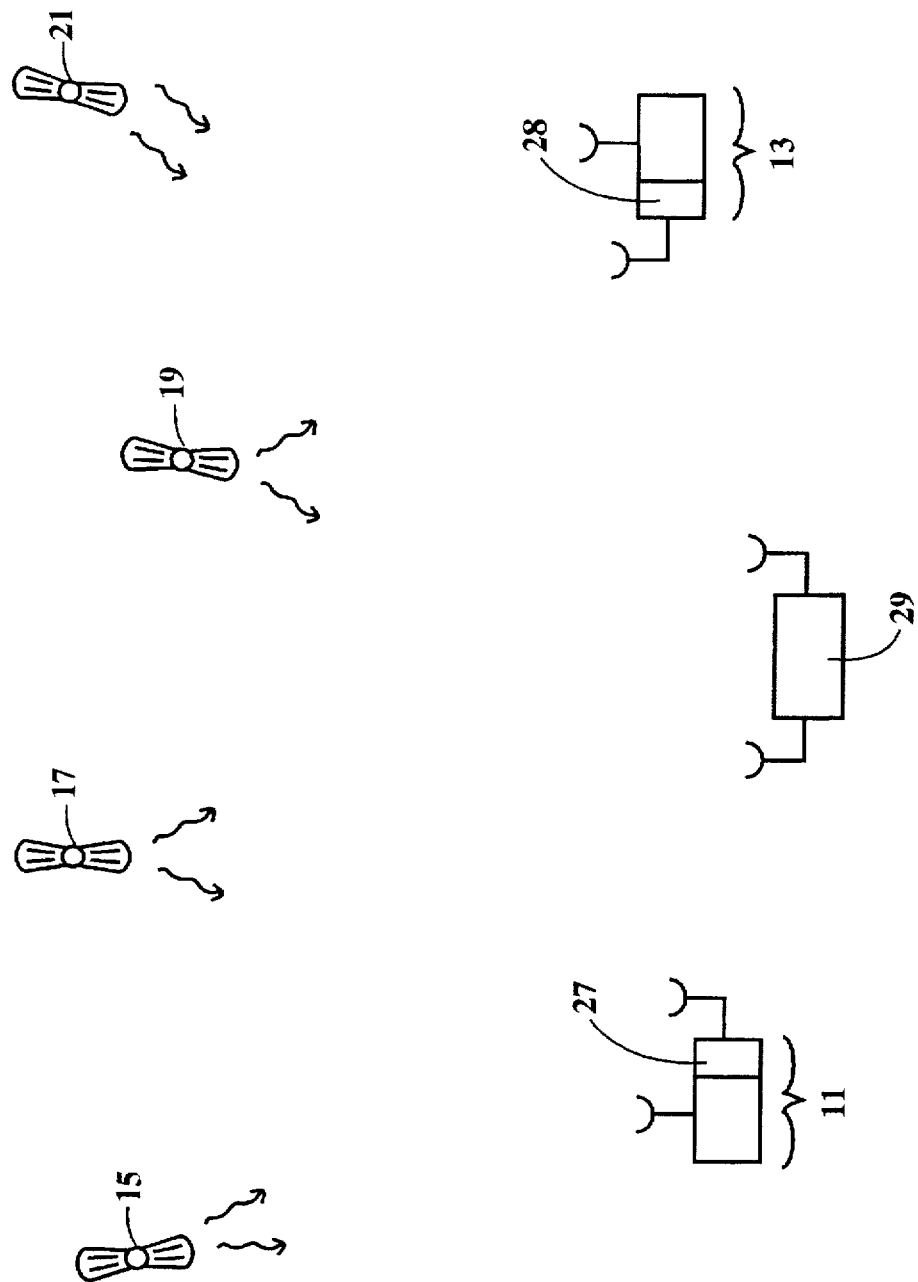
FIG. 1 is a schematic view of a suitable configuration of SATPS satellites and two ground receivers in which location, velocity and/or local time of a roving receiver can be determined using differential positioning techniques (DSATPS).

FIG. 1 illustrates a situation in which a differential SATPS may be used and enhanced by the invention. A reference SATPS receiver/processor and associated SATPS antenna ("reference station") 11 and a mobile SATPS receiver/processor and associated SATPS antenna ("mobile station") 13 are spaced apart on or adjacent to the Earth's surface, where it is assumed that the reference receiver's location is known very accurately at any time. The reference station 11 may be stationary or may be moving with location coordinates known as a function of time t. Four or more SATPS satellites 15, 17, 19 and 21 transmit SATPS signals that are received by the reference and mobile stations 11 and 13 and converted to present location, velocity and time of that station. The reference and mobile stations 11 and 13 also include modems 27 and 28, respectively, or other radio wave communication means that provide a one-way link from the reference station 11 to the mobile station 13 or a two-way link, as shown. Optionally, the system shown in FIG. 1 may also include one or more signal repeaters 29, located between the reference and mobile stations 11 and 13, to facilitate long distance or nonline-of-sight communication between these two stations.

Figure 2:
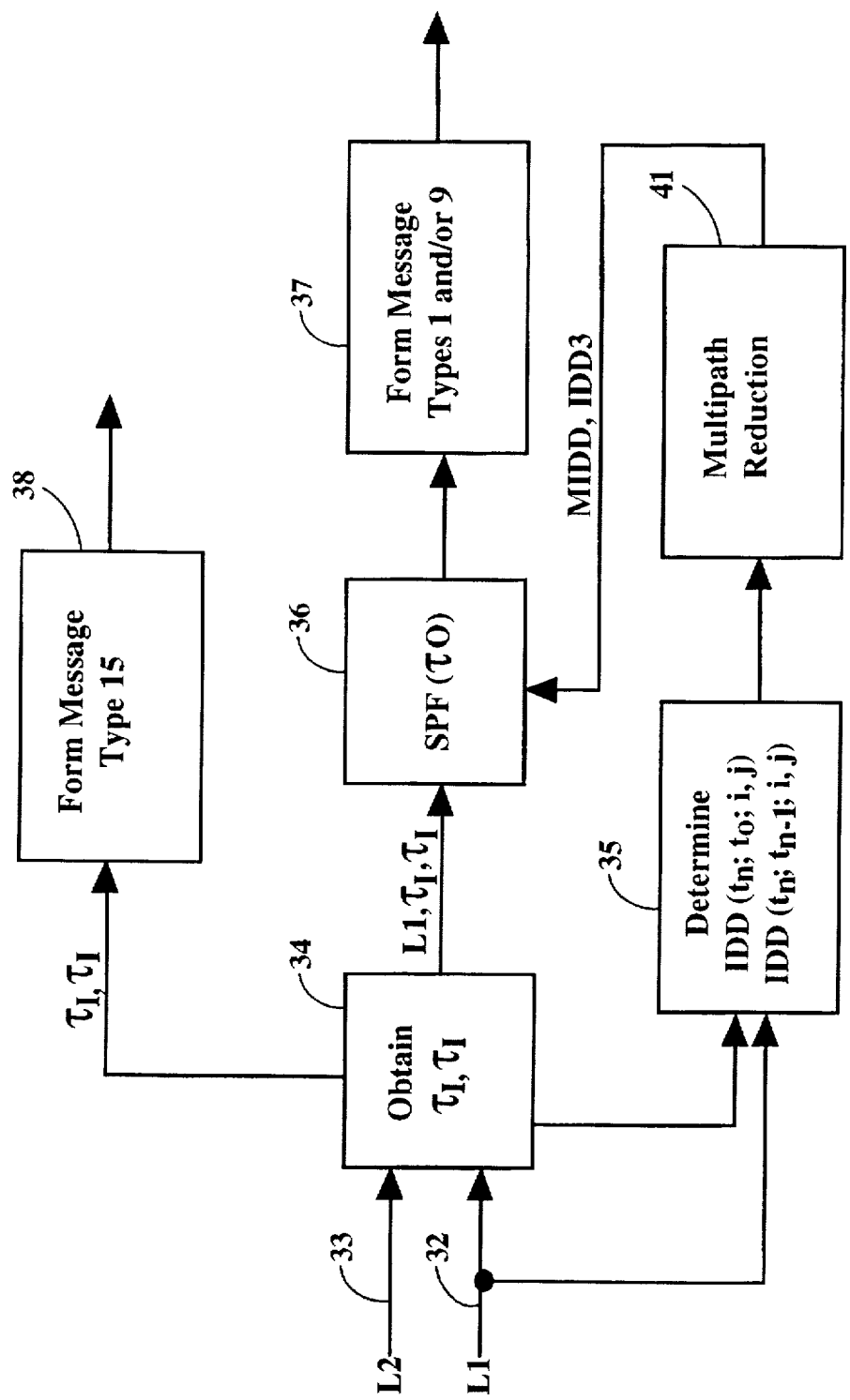
FIG. 2 is an overall schematic view of apparatus used for practicing the invention.

FIG. 2 schematically illustrates overall operation of the invention.

SATPS signals are received by the SATPS reference station (number i) from an SATPS satellite (number j) on carrier signals L1 and L2 with different frequencies, on input lines 32 and 33, respectively. These signals contain the information required to form pseudorange signals PR(t;i,j), pseudorange rate signals RR(t;i;j) and carrier phase signals D(t;i;j) for the particular SATPS station-satellite combination (ij) as a function of time t. These L1 and L2 signals are received by a first signal processing module 34. The first module 34 uses the L1 and L2 signals to determine the ionosphere group time delay rate of change with respect to time of group time delay $\tau_I(t;i;j)$ for propagation of that SATPS signal from the satellite (j) to the reference station (i) at a time t. Ionospheric time delay $\tau_I$ varies with signal frequency f approximately as $\tau_f = a + b/f^2$, where a and b are parameters that may vary with the direction of propagation through the ionosphere and with time t. MacDoran, in U.S. Pat. No. 4,463,357, discloses one method of estimating the constants a and b for ionospheric time delay, and other methods are also available. Given that one has measured the relative difference of the two group time delays $\tau_{fk}$ (k=1,2) and the difference of the two time delay rates $\tau_{fk}$ (k=1,2), the ionospheric group time delay $\tau_{f1}$ and group time delay rate of change $\tau_{f1}$ for the L1 carrier, are estimated by the relations $$\Delta\tau_f = \tau_{f1} - \tau_{f2} = \tau_{f1}[(f_{L1}/f_{L2})^2 - 1], \quad (1)$$

$$\Delta\tau_f = \tau_{f1} - \tau_{f2} = \tau_{f1}[(f_{L1}/f_{L2})^2 - 1], \quad (2)$$

The incoming L1 carrier signals and the ionospheric group time delay signals $\tau_f(i;j)$ and group time delay rate signals $\tau_f(i;j)$ are passed to a second signal processing module 35 that forms certain ionosphere-free, code phase-carrier phase difference signals IDD($t_n;t_m;i;j$) that are received by a multipath reduction (MR) signal processing module 41, as discussed in detail later. The MR signal processing module 41 issues an output signal that is a multipath-free version of the input signal IDD($t_n;t_m;i;j$), denoted as MIDD($t_n;t_m;i;j$), and an estimate of the multipath error signal IDD3($t_n;t_0;i;j$), which is passed to a third signal processing module 36 for further processing that will be described later.

Incoming SATPS signals S(t;i;j) (i=11, 13; j=15, 17, 19, 21) received by SATPS station number i from SATPS satellite number j in FIG. 1 include information on the pseudorange PR(t;i;j), on the pseudorange rate RRC(t;i;j) and on the carrier phase $\Phi(t;i;j)$ for station i and satellite j at a given time t. The pseudorange signal PR(t;i,j) includes a code signal that is specific for the satellite-receiver distance for receiver number i and satellite number j plus error contributions, including receiver noise error $\eta(t;i;j)$, multipath signal error m(t;i;j), satellite clock bias error SCB(t;j), receiver clock bias error RCB(t;i), troposphere signal propagation delay error $\tau_T(t;i;j)$, ionosphere signal propagation delay $\tau_f(t;i;j)$, and residual errors that are assumed to be small enough to be ignored here. The subscripts that appear with each of these error contributions indicate whether the error depends upon the station number (i), the satellite number (j), or both. The carrier phase signal $\Phi(t;i;j)$ is obtained from analysis of integrated Doppler shifts of the SATPS signals received and includes error contributions from receiver noise, multipath signal error, satellite clock bias error, and troposphere and ionosphere signal propagation delays. Additionally, the carrier phase signal $\Phi(t;i;j)$ includes a phase integer, N(i;j), whose value is initially ambiguous but does not change with time as long as continuous carrier lock is maintained. The pseudorange (code phase) signals and carrier phase signals is expressed in equivalent length units as $$PR(t;i;j) = R(t;i;j) + SCB(t;j) + RCB(t;i) + \tau_T(t;i;j) + \tau_f(t;i;j) + m(t;i;j) + \eta(t;i;j), \quad (3)$$

$$\Phi(t;i;j) = \lambda N(t;i;j) + R(t;i;j) + SCB(t;i;j) + RCB(t;i;j) + \tau_T(t;i;j) - \tau_f(t;i;j) + m'(t;i;j) + \eta'(t;i;j) \quad (4)$$

where R(t;i;j) ("SATPS range") represents the "true"range from the station number i to the satellite number j at the time t, as determined from SATPS navigation ephemeris (or almanac information) received by the reference station 11, and $\lambda$ is the SATPS carrier signal wavelength. Here, the multipath signal error contributions m(t;i;j) and m'(t;i,j) and the receiver noise error contributions $\eta(t;i;j)$ and $\theta'(t;i,j)$ can be different for the pseudorange and carrier phase, but the following relations are expected to hold generally:

$$|m'(t;i;j)| \ll |m(t;i;j)|, \quad (5)$$

$$|\eta'(t;i;j)| \ll |\eta(t;i;j)|. \quad (6)$$

Two new "ionosphere-free" difference signals are then formed, $$\Delta IPR(t;t_0;i;j) = PR(t;i;j) - \tau_f(t;i;j) - (PR(t_0;i,j) - \tau_f(t_0;i;j)), \quad (7)$$

$$\Delta I\Phi(t;i;j) = \Phi(t;i;j) + \tau_f(t;i;j) - (\Phi(t_0;i;j) + \tau_f(t_0;i;j)) \quad (8)$$

which are sometimes referred to as the ionosphere-free code-phase-derived delta range and the ionosphere-free carrier-phase-derived delta range, respectively. The absolute ionosphere time delays $\tau_f(t;i;j)$ and $\tau_f(t_0;i;j)$ are removed from the quantities $\Delta IPR(t;i;j)$ and $\Delta I\Phi(t;i;j)$. It is also possible to set the initial values PR($t_0;i;j$) and $\Phi(t_0;i;j)$ equal to arbitrary numbers, such as zero. The phase integer ambiguity $\lambda N$ cancels in the carrier-phase-derived delta range $\Delta I\Phi_{i,j}(t;t_0)$ in Eq. (8).

A third difference signal $$IDD(t;t_0;i;j) = \Delta IPR(t;t_0;i;j) - \Delta I\Phi(t;t_0;i;j) \qquad (9)$$
$$= (m(t;i;j) - m(t_0;i;j)) - (m'(t;i;j) - m'(t_0;i;j)) +$$
$$(\eta(t;i;j) - \eta(t_0;i;j)) - (\eta'(t;i;j) - \eta'(t_0;i;j))$$
$$= (m(t;i;j) - m(t_0;i;j)) + (\eta(t;i;j) - \eta(t_0;i;j)),$$

sometimes called an ionosphere-free "code - carrier" signal, is then formed and used to separately determine the multipath signal error and receiver noise error contributions.

Figure 3:
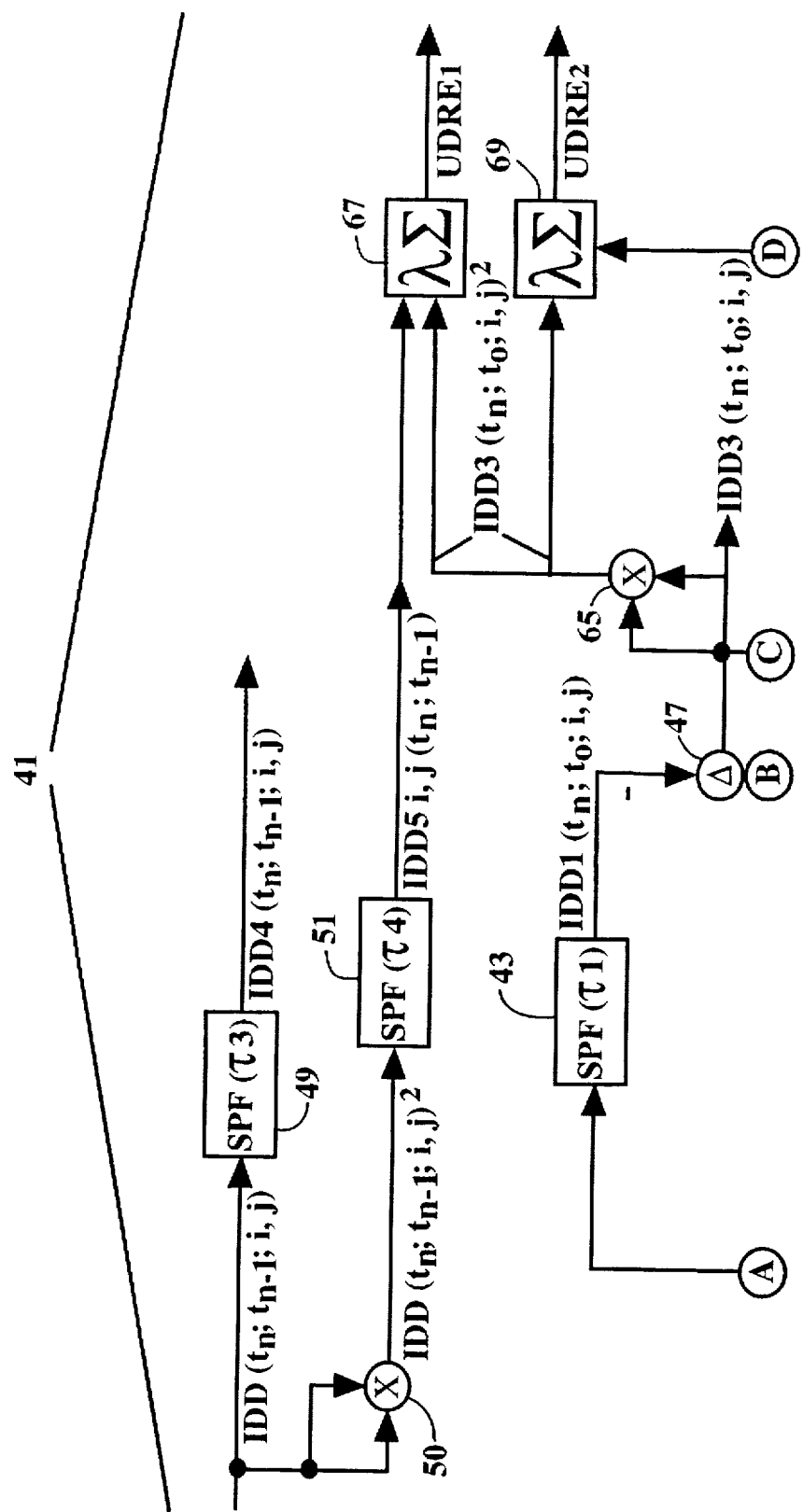
FIG. 3 is an expanded schematic view of part of the apparatus shown in FIG. 2.
Figure 3:
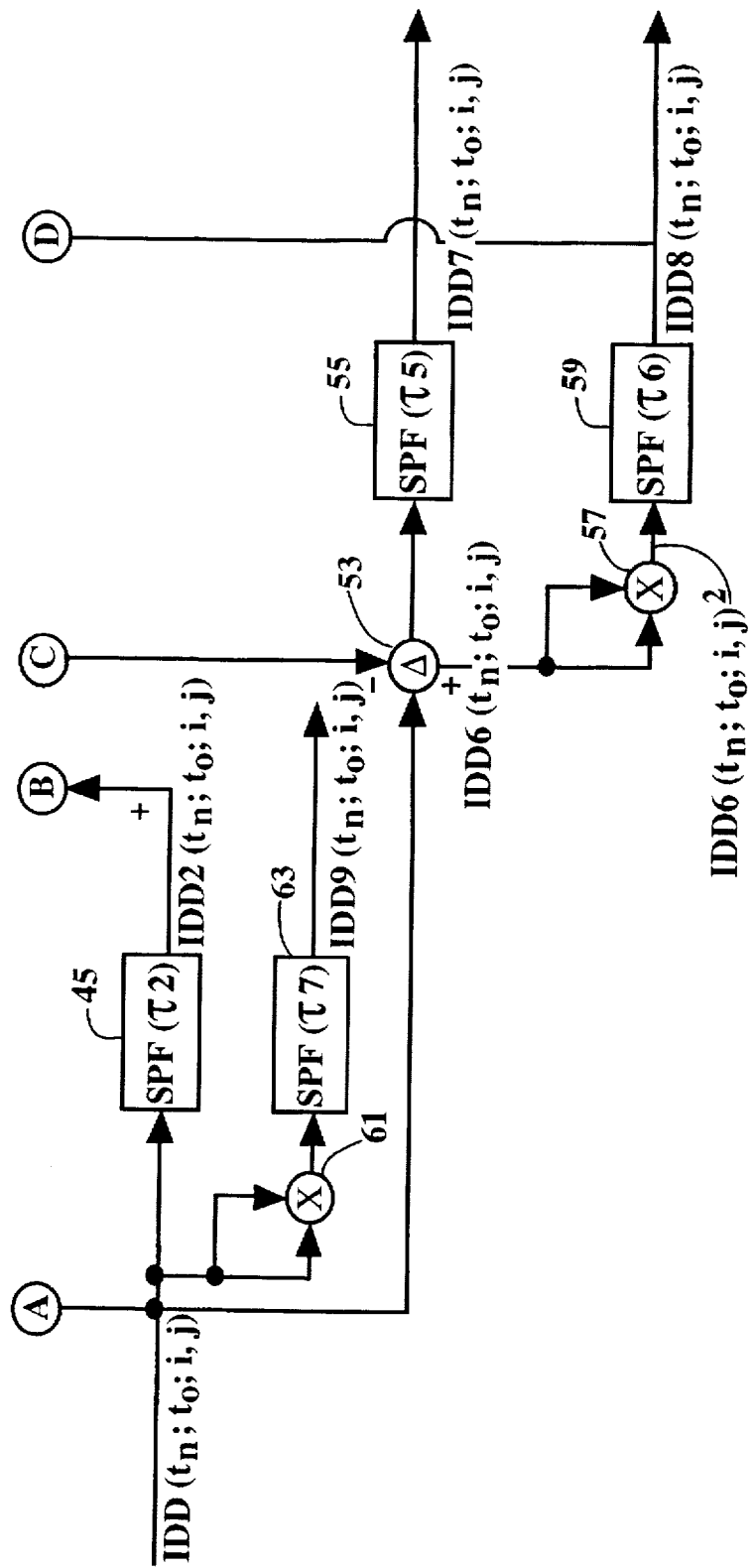

FIG. 3 illustrates an embodiment of the MR signal processing module 41 suitable for determination of some of these error contributions. An SATPS difference signal IDD $(t_n;t_0;i;j)$ is formed and passed through a first SPF 43 having a first selected time constant 1=5 to 20 sec ($\tau 1$=6 sec preferred) to produce an output signal IDD1$(t_n;t_0;i;j)$ that contains a multipath signal error contribution and a receiver noise error contribution. The difference signal IDD$(t_n;t_0;i;j)$ is also passed through a second SPF 45 having a second selected time constant $\tau 2$=50 to 1000 sec (with $\tau 2$=600 sec preferred) to produce an output signal IDD2$(t_n;t_0;i;j)$ that contains a running estimate mean value of the input signal IDD$(t_n;t_0;i;j)$. The two signals IDD1$(t_n;t_0;i;j)$ and IDD2$(t_n;t_0;i;j)$ are received at two input terminals of a first difference module 47, and a difference output signal $$IDD3(t_n;t_0;i;j)=IDD2(t_n;t_0;i;j)-IDD1(t_n;t_0;i;j) \qquad (10)$$

is formed that contains primarily the multipath signal and receiver noise error contributions.

An SATPS difference signal IDD$(t_n;t_{n-1};i;j)$ is optionally formed for a sequence of distinct, consecutive sampling times $t_n$ (with sampling time difference $t_n-t_{n-1}=\Delta t_s$=1 sec). Optionally, the signal IDD$(t_n;t_{n-1};i;j)$ is passed through a third statistical processing filter (SPF) 49 having a frequency break point f3, with a corresponding third time constant $\tau 3$=1/f3 of the order of 50–1000 sec ($\tau 3$=300 sec preferred). This produces an output signal IDD4$(t_n;t_{n-1};i;j)$ at the third SPF 49 that has little or no contribution from multipath signal error and contains primarily the receiver noise error contribution. The time difference $\Delta t_s=t_n-t_{n-1}$ can be chosen anywhere in an approximate range 0.1 to 5 sec.

Optionally, the SATPS difference signal IDD$(t_n;t_{n-1};i;j)$ is also squared in a product module 50 and passed through a fourth SPF 51, having an associated time constant $\tau 4 \approx \tau 3$, to produce an output signal, denoted IDD5$(t_n;t_{n-1};i;j)$ in FIG. 3. The filtered difference signals IDD$^4$$(t_n;t_{n-1};i;j)$ and IDD5 $(t_n;t_{n-1};i;j)$ represent a statistically-determined running estimate mean and running estimate variance (square of the standard deviation), respectively, of the input signal IDD $(t_n;t_{n-1};i;j)$.

Optionally, the difference signal IDD3$(t_n;t_0;i;j)$ is subtracted from the original input signal IDD$(t_n;t_0;i;j)$ in a second difference module 53 to produce a difference output signal $$IDD6(t_n;t_0;i;j)=IDD(t_n;t_0;i;j)-IDD3(t_n;t_0;i;j) \qquad (11)$$

that is relatively free of multipath signal error. However, the signal IDD6$(t_n;t_0;i;j)$ does contain a contribution from receiver noise error. The signal IDD6$(t_n;t_0;i;j)$ can be characterized as the output signal from a notch frequency filter that eliminates contributions from frequencies in a narrow, sharply defined frequency band centered at a representative multipath frequency to be removed.

Optionally, the signal IDD6$(t_n;t_0;i;j)$ is passed through a fifth SPF 55 having a selected fifth time constant $\tau 5$=50 to 1000 sec (with $\tau 5 \approx 4$ preferred), to reduce or remove the remaining receiver noise error contribution and to produce a smoothed or filtered output signal IDD7$(t_n;t_0;i;j)$ that is relatively free of receiver noise and multipath error.

Optionally, a squared signal (IDD6$(t_n;t_0;i;j)$ )$^2$ is formed in a product module 57, and is passed through a sixth SPF 59 having a selected time constant $\tau 6 \approx 4$ to produce an output signal IDD8$(t_n;t_0;i;j)$. The filtered difference signals IDD7 $(t_n;t_0;i;j)$ and IDD8$(t_n;t_0;i;j)$ represent the running estimate mean and running estimate variance, respectively, of the signal IDD3$(t_n;t_0;i;j)$.

Optionally, the square of the input difference signal IDD $(t_n;t_0;i;j)$ is formed by a product module 61 and passed through a seventh SPF 63 with a selected time constant $\tau 7 (\approx \tau 4)$ to produce an output signal IDD9$(t_n;t_0;i;j)$ that contains a running estimate variance of the input signal IDD$(t_n;t_0;i;j)$.

Optionally, the signal IDD3$(t_n;t_0;i;j)$ is multiplied by itself in a product module 65 to produce an output signal (IDD3 $(t_n;t_0;i;j))^2$.

For a sequence $\{t_n\}_n$ of signal sampling times, a filtered difference signal, such as IDD8$(t_n;t_0;i;j)$, is optionally formed using the relations $$FIDD8(t_n;t_0;i,j)=A_n IDD7(t_n;t_0;i;j)+(1-A_n)IDD8(t_n;t_0;i;j) \qquad (12)$$

Here $A_n$ is a filter coefficient, defined as follows in a preferred embodiment of the filter $$A_n = 1/n \, (n=1, 2, \ldots, N) \qquad (13)$$
$$= 1/N \, (n > N),$$

and N is a selected positive integer. The filter having coefficients defined by Eq. (13) has been introduced by N. Morrison, op. cit., and is sometimes referred to as a Morrison filter. A Hatch filter may also be used here. A Kalman filter may also be used to analyze combined code phase and carrier phase signals. In practice, any monotonic sequence of positive filter coefficients $A_n$ satisfying the relations $$0 \leq A_L = Lim_{m \to \infty} A_m \leq A_n \leq A_{n-1} (n=2,3, \ldots ) \qquad (14)$$

can probably be used for the filter coefficients, where this sequence has a finite window width W; such a sequence of filter coefficients is referred to here as a "positive, monotonic, finite width filter set". The integer N in Eq. (13) serves as a measure of the width of the filter window for the Morrison filter. The seven SPFs 43, 45, 49, 51, 55, 59 and 63 may be constructed similarly, but with independently chosen time constants.

For reduction or removal of the multipath signal error, a filter window width $W_{mu}$ (in sec) in the range $5 \leq W_{mu} \leq 20$ is often suitable, with $W_{mu}$=6 being a good choice for some applications. For reduction of the receiver noise error, a filter window width $W_n$ (in sec) in the range $50 \leq W_n \leq 1000$ is often suitable, with $W_n$=300 (for single frequency processing) or $W_n$=600 (for dual frequency processing) being a good choice for some applications. The relevant difference signals are optionally formed in parallel, as indicated in FIG. 3.

In "Special Committee 104 Recommendations for Differential GPS Service", Navigation, vol. 1, no. 1 (1986), pp. 101–116, R. Kalafus, A. Van Dierendonck and N. Pealer introduce and discuss the User Differential Range Error ("UDRE"), which is a measure of statistical 1$\sigma$ differential range error having any of four error ranges, as set forth in Table 1.

TABLE 1

UDRE

| Code | No. | UDRE Range (R) |
|------|-----|----------------|
| 00   | 0   | R ≦ meter (M)  |
| 01   | 1   | 1 M < R ≦ 4 M  |
| 10   | 2   | 4 M < R ≦ 8 M  |
| 11   | 3   | R > 8 M        |

The quantity UDRE in Table 1 is the square root of the squares of the 1σ statistical values for the multipath signal error and receiver noise error, regarded as random variables.

$$UDRE = |(1\sigma(\text{multipath}))^2 + (1\sigma(\text{rcvr noise}))^2|^{1/2} \quad (15)$$

A multiplicative scale factor SF, specified by a scale factor bit and having two values (0.02 and 0.32 for pseudorange corrections; and 0.002 and 0.032 for pseudorange rate corrections) is used to increase the range of the corrections. However, use of a scale factor SF and the increased range of corrections produces reduced resolution for the corrections: 2–32 cm for pseudorange and 0.2–3.2 cm/sec for pseudorange rate.

Optionally, the quantities $IDD5(t_n;t_{n-1};i;j)$ and $(IDD3(t_n;t_0;i;j))^2$ are summed and the square root of this sum is formed in a module 67 to form a first running estimate of a UDRE parameter defined by $$UDRE1(t_n)^2 = IDD5_{i,j}(t_n;t_{n-1}) + (IDD3_{i,j}(t_n;t_0))^2, \quad (16)$$

Optionally, the quantities $IDD9(t_n;t_{n-1};i,j)$ and $(IDD3(t_n;t_0;i;j))^2$ are summed and the square root of this sum is formed in a module 69 to form a second running estimate of a UDRE parameter, defined by $$UDRE_2(t_n)^2 = IDD8(t_n;t_0;i;j) + (IDD3(t_n;t_0;i;j))^2. \quad (17)$$

The multipath signal error contribution $IDD3(t_n;t_0;i;j)$ issued by the MR signal processing module 41 is passed to a third signal processing module 36 in FIG. 2 and is subtracted therein from the pseudorange and carrier phase signals PR(t;i,j) and Φ(t;i,j) to produce corresponding pseudorange and carrier phase output signals MPR(t;i;j) and MΦ(t;i;j) that are substantially free of multipath signal error.

The L1 signals and the time delay $\tau_I(t;i;j)$ and rate of change with respect to time of time delay $\tau_I(t;i;j)$ are received by the third signal processing module 36 that forms an ionosphere-free pseudorange signal MIPR(t;i;j) and an ionosphere-free carrier phase signal MIΦ(t;i;j). This module 36 filters these latter two signals in an RTCM statistical processing filter SPF(τ0) having an associated filter constant τ0 that may be in the range 50 ≦ τ0 < 1000 sec. The two signals MIPR(t;i;j) and MIΦ(t;i;j) have the "true" ionosphere time delay $\tau_1(t;i,j)$ and rate of change with respect to time of time delay $\tau_I(t;i;j)$, respectively, added back in or adjacent to the third signal processing module 36. This produces filtered pseudorange and carrier phase signals FMPR(t;i,j) and FMΦ(t;i;j) that are substantially free of multipath error and have the true ionosphere group time delay and group time delay rate of change, respectively, included therein. The third signal processing module 36 performs code/carrier signal filtering and issues pseudorange corrections PRC(t;i;j) and pseudorange rate corrections RRC(t;i,j) for the SATPS reference station (i) by comparing its known, time varying range from the satellite (j) with the pseudorange determined from the SATPS signals received from that satellite. These correction signals are delivered to the first RTCM output module 37 and are incorporated in RTCM Type 1 and/or Type 9 messages, including PRC and RRC information, transmitted from this module. The ionosphere time delay and time delay rate of change, $\tau_I(t;i;j)$ and $\tau_I(t;i;j)$, are delivered to the second RTCM output module 38 and are incorporated in RTCM Type 15 messages transmitted from this module.

Figure 4:
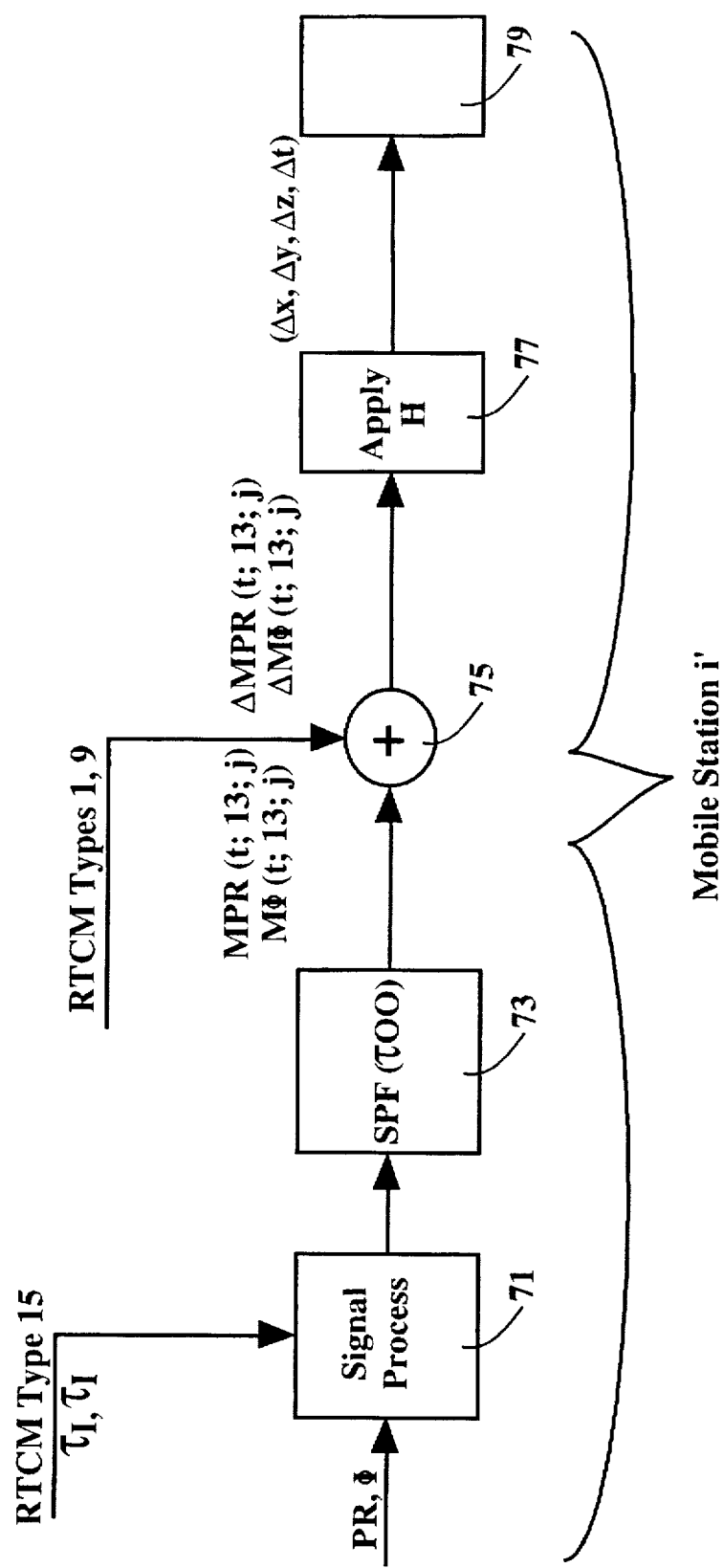
FIG. 4 is a schematic view illustrating processing of RTCM Type 1, 9 and 15 messages received at a mobile SATPS station according to an embodiment of the invention.

The output signals transmitted by the RTCM output modules 37 and 38 are received by a mobile SATPS station 13, as illustrated in FIG. 4. The mobile station 13 receives the uncorrected pseudorange and carrier phase signals PR(t;i;j) and Φ(t;i,j) (i=13) from the SATPS satellite number j and receives the RTCM Type 15 message from the second RTCM module 38 (FIG. 2). The ionosphere time delay and time delay rate signals $\tau_I(t;i;j)$ and $\tau_I(t;i;j)$ are combined with the uncorrected pseudorange and carrier phase signals PR(t;13;j) and Φ(t;13;j) in a first mobile station signal processing module 71 and passed through an SPF 73 having an associated time constant τ(mobile) ≈ τ0 to determine the multipath-reduced pseudorange and carrier phase signals MPR(t;13;j) and MΦ(t;13;j). These signals are combined with the incoming RTCM Type 1 and Type 9 messages in a sum module 75, to produce pseudorange residuals and carrier phase residuals ΔMPR(t;13;j) and ΔMΦ(t;13;j) that are corrected for multipath errors and have common errors for the mobile user and reference stations 13 and 14 removed. These corrections are determined for each of four (or more) visible SATPS satellites (j=j1, j2, j3, j4), and the residuals for each of these satellites are passed to an algebraic module 77 that applies a matrix $H^{-1}$ to these input signals to produce corrections (Δx,Δy,Δz,Δt) for the space and time coordinates associated with the SATPS measurements performed at the mobile station 13. Entries for the matrix H, according to one approach, are discussed and derived by P. Jorgensen, in "Navstar/Global Positioning System 18-Satellite Constellations", The Journal of Navigation, vol. 2 (1984) pp. 1–12.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=150 of and f2=120 f0 of a base frequency 0.1 f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay∝$f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of 0.1 f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7,000 days) before this code portion repeats. Accepted methods for generating the C/A-code and P-code are set forth in the document GPS Interface Control Document ICD-GPS-200, published by Rockwell International Corporation, Satellite Systems Division, Revision A, Sep. 26, 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . . 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System, such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

I claim:

1. A method for reducing multipath signal error from signals received in a Satellite Positioning System (SATPS) from one or more SATPS satellites, the method comprising the steps of:

receiving SATPS signals, which have been transmitted from one or more SATPS satellites, numbered j=1, 2, . . . , at one or more SATPS reference stations, numbered i=1, 2, . . . , whose location coordinates are accurately known, where each SATPS signal includes at least one indicium that is specific to the satellite that transmitted that SATPS signal;

processing the SATPS signals at each SATPS reference station to produce pseudorange measurement values $PR(t;i;j)$ and to produce carrier phase measurement values $\Phi(t;i;j)$ that vary with time t, for a sequence of selected signal sampling times $\{t_n\}_n$;

determining an ionospheric propagation time delay $\tau_I(t;i;j)$ and a rate of change with respect to time of ionospheric propagation time delay $\tau_I'(t;i;j)$ for SATPS signal propagation through an ionosphere from satellite number j toward each SATPS reference station;

for a selected time $t_0$ and a subsequent sampling time $t_n$, forming a difference signal $IDD(t_n;t_0;i;j) = \{PR(t_n;i;j) - \tau_I(t_n;i;j)\} - \{PR(t_0;i;j) - \tau_I(t_0;i;j)\} - \{\Phi(t_n;i;j) + \tau_I(t_n;i;j)\} + \{\Phi(t_0;i;j) + \tau_I(t_0;i;j)\}$;

passing the difference signal $IDD(t_n;t_0;i;j)$ through a first statistical processing filter having a first selected filter time constant $\tau 1$ that lies in a range 5–20 seconds, to produce a first output signal $IDD1(t_n;t_0;i;j)$;

passing the signal $IDD(t_n;t_0;i;j)$ through a second statistical processing filter having a second selected filter time constant $\tau 2$ that lies in a range 50–1000 seconds, to produce a second output signal $IDD2(t_n;t_0;i;j)$; and forming a difference signal $IDD3(t_n;t_0;i;j) = IDD2(t_n;t_0;i;j) - IDD1(t_n;t_0;i;j)$ as a third output signal that contains primarily SATPS multipath signal error; and forming a difference signal $MPR(t_n;t_0;i;j) = PR(t_n;i;j) - IDD3(t_n;t_0;i;j)$ as a pseudorange output signal that has reduced multipath signal error.

2. The method of claim 1, further comprising the steps of:

transmitting said time delay $\tau_I(t;i;j)$ and said rate of change with respect to time of time delay $\tau_I'(t;i;j)$ to a selected SATPS station, numbered i';

passing said output signal $MPR(t_n;t_0;i;j)$ through a third statistical processing filter, having a selected filter time constant $\tau 0$ that lies in a range 50–1000 seconds, to form a filtered output signal $FMPR(t_n;t_0;i;j)$;

transmitting the filtered output signal $FMPR(t_n;t_0;i;j)$ to the selected SATPS station;

forming a signal $PR(t_n;i';j) - \tau_I(t_n;i;j)$ at the selected SATPS station and passing this signal through a fourth statistical processing filter having a selected time constant $\tau 00$ that lies in a range 20–1000 seconds, to produce a filtered output signal $F\{PR(t_n;i';j) - \tau_I(t_n;i;j)\}$; and forming the sum $F\{PR(t_n;i';j) - \tau_I(t_n;i;j)\} + FMPR(t_n;t_0;i;j)$, as a pseudorange signal that is corrected for multipath signal errors and for ionospheric time delay errors and ionospheric propagation rate of change of time delay errors.

3. The method of claim 2, further comprising the steps of:

forming a difference signal $M\Phi(t_n;t_0;i;j) = \Phi(t_n;i;j) + \tau_I(t_n;i;j) - IDD3(t_n;t_0;i;j)$ as a carrier phase output signal;

passing the output signal $M\Phi(t_n;t_0;i;j)$ through said third statistical processing filter to produce a filtered output signal $FM\Phi(t_n;t_0;i;j)$;

transmitting the filtered output signal $FM\Phi(t_n;t_0;i;j)$ to said selected SATPS station;

forming a signal $\Phi(t_n;i;j) + \tau_I(t_n;i;j)$ at said selected SATPS station and passing this signal through said fourth statistical processing filter to produce a filtered output signal $F\{\Phi(t_n;i;j) + \tau_I(t_n;i;j)\}$; and forming a sum $F\{\Phi(t_n;i;j) + \tau_I(t_n;i;j)\} + FM\Phi(t_n;t_0;i;j)$, as a carrier phase output signal that is corrected for ionospheric propagation time delay errors.

4. The method of claim 1, further comprising the step of choosing at least one of said first and second statistical processing filters from a group consisting of a Morrison filter, a Hatch filter and a Kalman filter.

5. The method of claim 1, further comprising the step of choosing said time constant $\tau 1$ to be in a range 6–10 seconds.

6. The method of claim 1, further comprising the step of choosing said time constant $\tau 2$ to be in range 600–1000 seconds.

7. The method of claim 1, further comprising the steps of:

forming a difference signal $IDD(t_n;t_{n-1};i;j) = \{PR(t_n;i;j) - \tau_I(t_n;i;j)\} - \{PR(t_{n-1};i;j) - \tau_I(t_{n-1};i;j)\} - \{\Phi(t_n;i;j) + \tau_I(t_n;i;j)\} + \{\Phi(t_{n-1};i;j) + \tau_I(t_{n-1};i;j)\}$;

passing the signal $IDD(t_n;t_{n-1};i;j)$ through said first and said second statistical processing filters, to produce output signal $IDD1(t_n;t_{n-1};i;j)$ and $IDD2(t_n;t_{n-1};i;j)$;

forming a difference signal $IDD3(t_n;t_{n-1};i;j) = IDD2(t_n;t_{n-1};i;j) - IDD1(t_n;t_{n-1};i;j)$;

passing the signal $IDD(t_n;t_{n-1};i;j)$ through a third statistical processing filter having a third selected filter time constant $\tau 3$ that lies in a range 50–1000 sec, to produce a fourth output signal $IDDR(t_n;t_{n-1};i;j)$;

forming a difference signal $IDD6(t_n;t_{n-1};i;j) = IDD(t_n;t_{n-1};i;j) - IDD3(t_n;t_{n-1};i;j)$ as an output signal, which corresponds to an SATPS signal with reduced SATPS multipath signal error and reduced ionospheric propagation time delay error; and passing the output signal $IDD6(t_n;t_{n-1};i;j)$ through a fourth statistical processing filter having a fifth selected filter time constant $\tau 5$ that lies in a range 50–1000 sec, to produce an output signal $IDD7(t_n;t_{n-1};i;j)$, which corresponds to an SATPS signal with reduced SATPS receiver noise error and reduced ionospheric propagation time delay error.

8. The method of claim 7, further comprising the step of choosing said time constant $\tau 3$ to be in a range 300–1000 seconds.

9. The method of claim 7, further comprising the step of choosing said time constant $\tau 4$ to be in a range 300–1000 seconds.

10. The method of claim 7, further comprising the step of choosing at least one of said first and second statistical processing filters to be a notch filter having a selected filter time constant $f_c = 1/\tau_c$ that lies in a range 0.001–0.2 Hertz.

11. The method of claim 7, further comprising the step of choosing at least one of said first, second, third and fourth statistical processing filters from a group consisting of a Morrison filter, a Hatch filter and a Kalman filter.

12. The method of claim 7, further comprising the step of choosing at least one of said first, second, third and fourth statistical processing filters to be a positive, monotonic, finite width filter.

13. The method of claim 7, further comprising the steps of:

forming a squared signal $IDD3(t_n;t_{n-1};i;j)^2$ from the squared signal $IDD3(t_n;t_{n-1};i;j)^2$ and passing this squared signal through a fifth statistical processing filter having a fifth selected filter time constant $\tau 4$ that lies in a range 50–1000 seconds, to produce an output signal $IDD5(t_n;t_{n-1};i;j)$; and forming a combined signal $\{IDD5t_n;t_{n-1};i;j) + IDD3(t_n;t_0;i;j)^2\}^{1/2}$ as a User Differential Range Error Signal.

14. The method of claim 7, further comprising the steps of:

forming a squared signal $IDD6(t_n;t_{n-1};i;j)^2$ from said signal $IDD6(t_n;t_{n-1};i;j)$ and passing squared signal $IDD6(t_n;t_{n-1};i;j)^2$ through a sixth statistical processing filter having a fifth selected filter time constant $\tau 6$ that lies in a range 50–1000 seconds, to produce an output signal $IDD8(t_n;t_{n-1};i;j)$; and forming a combined signal $\{IDD8(t_n;t_{n-1};i,j)+IDD3(t_n;t_{n-1};i,j)^2\}^{1/2}$ as a User Differential Range Error signal.

15. The method of claim 7, further comprising the step of forming a signal $IDD(t_n;t_{n-1};i;j)^2$ and passing this signal through a seventh statistical processing filter having a seventh selected filter time constant τ7 that lies in a range 50–1000 seconds, to produce an output signal $IDD9(t_n;t_{n-1};i;j)$, as a measure of variance of said signal $IDD(t_n;t_0;i;j)$.

16. A method for reducing multipath signal error from signals received in a Satellite Positioning System (SATPS) from one or more SATPS satellites, the method comprising the steps of:

receiving SATPS signals from one or more SATPS signal sources at one or more SATPS reference stations, whose location coordinates are accurately known, where each SATPS signal includes at least one indicium that is specific to the signal source that transmitted that SATPS signal;

processing the SATPS signals at each SATPS reference station to produce pseudorange measurement values and carrier phase measurement values that vary with time t, for a sequence of selected signal sampling times;

determining an ionospheric propagation time delay and a rate of change with respect to time of ionospheric propagation time delay for SATPS signal propagation through an ionosphere from satellite number j toward each SATPS reference station;

forming first and second signals that are differences between the pseudorange measurement value and the ionospheric propagation time delay for a selected time and for a subsequent sampling time, respectively;

forming third and fourth signals that are sums of the carrier phase measurement value and the rate of change of the ionospheric propagation time delay for a selected time and for a subsequent sampling time, respectively;

forming a fifth signal that is a sum of the second and third signals minus a sum of the first and fourth signals, and passing the fifth signal through a first statistical processing filter having a first selected filter time constant τ1 that lies in a range 5–20 seconds, to produce a first output signal;

passing the fifth signal through a second statistical processing filter having a second selected filter time constant τ2 that lies in a range 50–1000 seconds, to produce a second output signal;

forming a third output signal that is a difference between the first output signal and the second output signal; and forming a fourth output signal that is a difference between the pseudorange measurement value at the subsequent sampling time and the third output signal.

17. The method of claim 16, further comprising the steps of:

transmitting said ionospheric propagation time delay and said rate of change with respect to time of ionospheric propagation time delay to a selected SATPS station;

passing said fourth output signal through a third statistical processing filter, having a selected filter time constant τ0 that lies in a range 50–1000 seconds, to form a filtered fourth output signal;

transmitting the filtered fourth output signal to the selected SATPS station;

forming said second signal at the selected SATPS station and passing this signal through a fourth statistical processing filter having a selected time constant τ00 that lies in a range 20–1000 seconds, to produce a filtered second signal; and forming a fifth output signal as a sum of the filtered fourth output signal and the filtered second signal, as a pseudorange signal that is corrected for multipath signal errors and for ionospheric time delay errors and ionospheric propagation rate of change of time delay errors.

18. The method of claim 17, further comprising the steps of:

forming a sixth output signal that is a difference between said fourth signal and said third output signal;

passing the sixth output signal through said third statistical processing filter to produce a filtered sixth output signal;

transmitting the filtered sixth output signal to said selected SATPS station;

forming said fourth signal at said selected SATPS station and passing this signal through said fourth statistical processing filter to produce a filtered fourth signal; and forming a sum of the filtered sixth output signal and the filtered fourth signal, as a carrier phase output signal that is corrected for ionospheric propagation time delay errors.

19. The method of claim 16, further comprising the steps of:

forming sixth and seventh signals that are differences between the pseudorange measurement value and the ionospheric propagation time delay for a selected sampling time and for a preceding sampling time, respectively;

forming eighth and ninth signals that are sums of the carrier phase measurement value and the rate of change of the ionospheric propagation time delay for the selected sampling time and for the preceding sampling time, respectively;

forming a tenth signal that is a sum of the seventh and eighth signals minus a sum of the sixth and ninth signals, and passing the tenth signal through said first statistical processing filter to produce a first filtered tenth signal;

passing the tenth signal through said second statistical processing filter to produce a second filtered tenth signal;

forming an eleventh signal that is a difference between the first filtered tenth signal and the second filtered tenth signal;

passing the tenth signal through a third statistical processing filter having a third selected filter time constant τ3 that lies in a range 50–1000 seconds, to produce a third filtered tenth signal;

forming a twelfth signal that is a difference between the tenth signal and the eleventh signal, as an output signal that corresponds to an SATPS signal with reduced SATPS multipath signal error and reduced ionospheric propagation time delay error; and passing the twelfth signal through a fourth statistical processing filter having a fifth selected filter time constant τ5 that lies in a range 50–1000 seconds, to produce an filtered twelfth signal that corresponds to an SATPS signal with reduced SATPS receiver noise error and reduced ionospheric propagation time delay error.

20. The method of claim 11, further comprising the steps of:

forming a thirteenth signal that is the square of said eleventh signal, and passing the thirteenth signal through a fifth statistical processing filter having a fifth selected filter time constant τ4 that lies in a range 50–1000 seconds, to produce a filtered thirteenth signal;

forming a sum of the filtered thirteenth signal and a square of said eleventh signal to form a first combined signal that is a measure of a User Differential Range Error signal.

21. The method of claim 19, further comprising the steps of:

forming a fourteenth signal that is the square of said twelfth signal, and passing the fourteenth signal through a sixth statistical processing filter having a sixth selected filter time constant $\tau 6$ that lies in a range 50–1000 seconds, to produce a filtered fourteenth signal;

forming a sum of the filtered fourteenth signal and a square of said twelfth signal to form a second combined signal that is a measure of a User Differential Range Error signal.

22. The method of claim 19, further comprising the step of forming a square of said tenth signal and passing this signal through a seventh statistical processing filter having a seventh selected filter time constant $\tau 7$ that lies in a range 50–1000 seconds, to produce a fifteenth signal that is a measure of the variance of said tenth signal.

* * * * *